UNITED STATES PATENT OFFICE.

DENNIS C. GATELY, OF NEWTOWN, CONNECTICUT.

IMPROVEMENT IN ELASTIC BELTING.

Specification forming part of Letters Patent No. 27,440, dated March 13, 1860.

*To all whom it may concern:*

Be it known that I, DENNIS C. GATELY, of Newtown, in the county of Fairfield and State of Connecticut, have invented certain new and useful improvements in the process of making machine belting or banding made wholly or in part of india-rubber or gutta-percha; and I do hereby declare that the following description forms a full and exact specification of the same, wherein I have set forth the nature and principles of my invention, by which it may be distinguished from all others of a similar class, together with such parts as I claim and desire to have secured to me by Letters Patent.

I have heretofore made improvements in the manufacture of india-rubber or gutta-percha belting or banding, which consists in giving a smooth friction-surface to the belt or band by various different modes—such as rolling it in sheets of flexible metal, paper, or cloth, &c.— for which I have already made applications for separate Letters Patent.

The present invention consists of a new method of imparting this peculiar smooth friction-surface to the belt or band.

I take a belt or band made in any method, having a surface covered partly or wholly with india-rubber or gutta-percha, and then vulcanize it in any method, the method ordinarily used before my invention being to expose it to the action of steam in long steam-boilers. The result of this and of many other processes of vulcanization is that the surface of the belt is left rough and uneven. Cloths are often laid between the surfaces of the belts as they are vulcanized, and these leave upon the surfaces of the belts indentations or ridges. My object is to remove these ridges or inequalities, in whatever manner produced, and thus to accomplish what my great purpose is—that is to say, the manufacture of belts with a smooth friction-surface, by which I save the motive power, and enable the machinery driven to be moved with much greater exactness, steadiness, and perfection of motion. To remove these inequalities or ridges I grind or polish down the surface of the belts by various methods. I do it either by hand or by machinery, although the latter is preferable.

The belt can be smoothed with hand-tools, or by grindstones, or by metal grinding-rollers, or in any other method, and I therefore do not limit myself to any particular method.

I have already obtained Letters Patent for all belts or bands having a smooth friction-surface, and several Letters Patent for different modes of producing this result; and as I have discovered the above-described method by grinding or polishing to be a very efficacious one, and wish to protect myself by Letters Patent for all the various manners in which the said smooth friction-surface belting can be produced, I shall in this application lay claim to the above-described mode by grinding or polishing the surface of the belt or band.

I do not claim the product of a smooth belt, as that is the subject of previous Letters Patent; but What I do claim, and desire to have secured to me by Letters Patent, is—

The belt or band produced with a friction-surface as smooth as it practically can be by grinding or polishing down the rough or unequal surface of the belt, substantially in the manner and for the purposes above described.

DENNIS C. GATELY.

Witnesses:
JONA. R. WIGGIN,
W. W. PERKINS.